H. L. BAILEY.
WINDOW CLEANER.
APPLICATION FILED OCT 4, 1907.
948,641.
Patented Feb. 8, 1910.
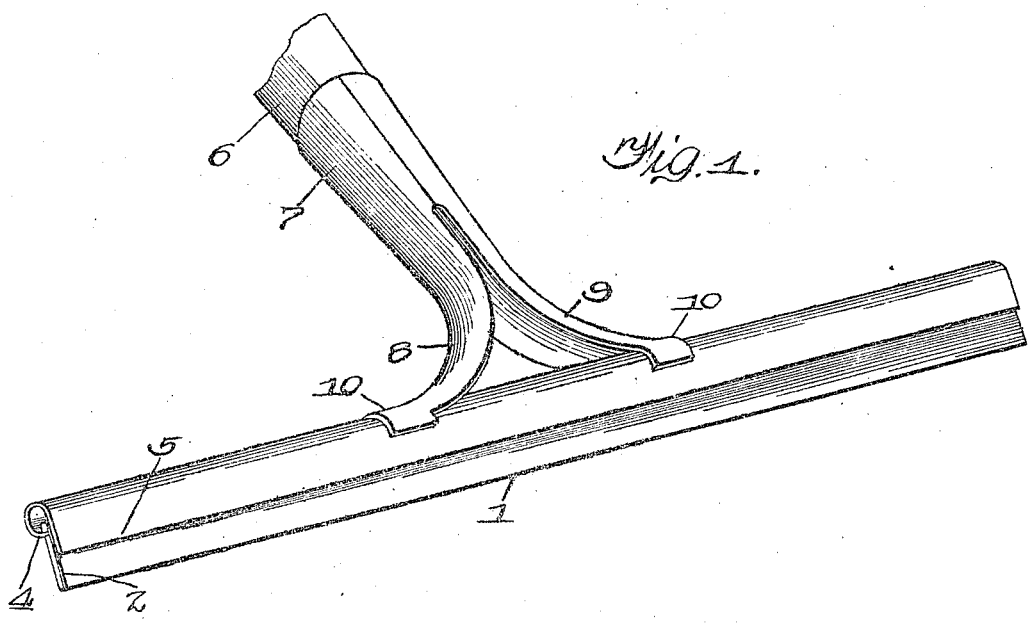
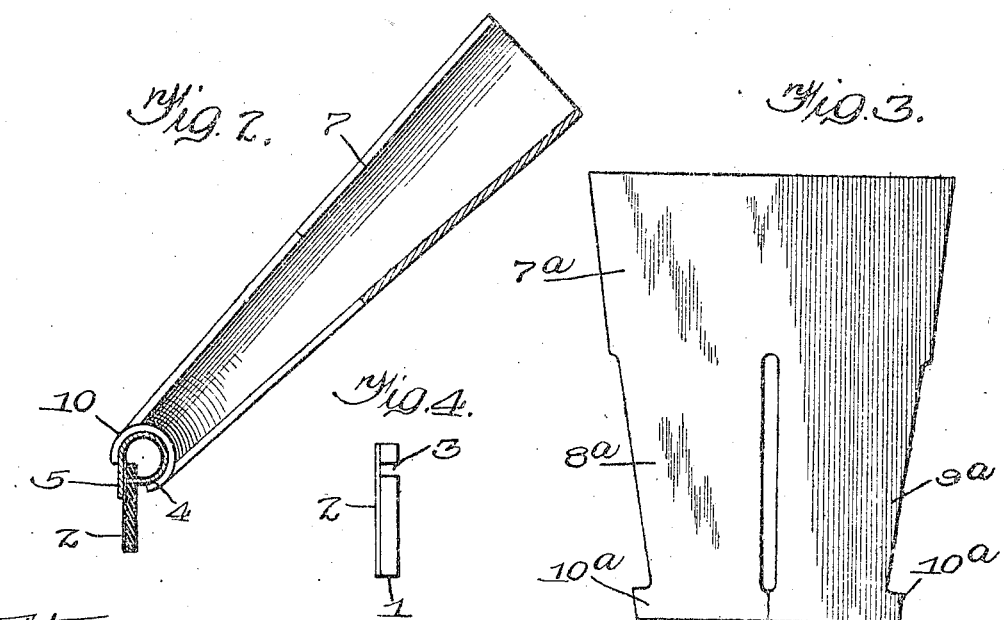

UNITED STATES PATENT OFFICE.

HERBERT L. BAILEY, OF LUDINGTON, MICHIGAN, ASSIGNOR TO HANDY THINGS COMPANY, OF LUDINGTON, MICHIGAN, A CORPORATION OF ILLINOIS.

WINDOW-CLEANER.

948,641.  Specification of Letters Patent.  Patented Feb. 8, 1910.

Application filed October 4, 1907. Serial No. 395,868.

*To all whom it may concern:*

Be it known that I, HERBERT L. BAILEY, a citizen of the United States, residing at Ludington, in the county of Mason and State of Michigan, have invented certain new and useful Improvements in Window-Cleaners, of which the following is a full, clear, and exact specification.

This invention relates to that class of window cleaners which employ a strip of rubber secured in a holder with its edge exposed in a suitable position for being wiped against the glass while the holder is supported and operated by means of a handle secured in a socket attached to the holder, and the invention has for one of its important objects to provide improved and simple means whereby the strip of rubber may be readily inserted in the holder and as readily removed to give place to a new strip when worn beyond usefulness.

Another object of the invention is to provide an improved and simple construction of socket for the attachment of the handle, which will be efficient in operation and inexpensive to manufacture and attach to the holder.

With a view to the attainment of these ends and the accomplishment of certain other objects which will hereinafter appear, the invention consists in the features of novelty which will now be described with reference to the accompanying drawing and more particularly pointed out in the claims.

In the said drawing Figure 1 is a perspective view of a window cleaner embodying this invention. Fig. 2 is a transverse section thereof taken on the central line or axis of the socket. Fig. 3 is a plan of the blank from which the socket is made, and Fig. 4 is an enlarged end view of the rubber.

The numeral 1 designates a wiper or squeegee constructed of any suitable material, such as rubber or the like which is preferably provided on one side with a reinforcing strip 2 of linen, canvas, or other suitable fabric. Along one edge this wiper is provided with a groove 3 for the reception of a flange 4 constituted by one edge of the holder which is composed preferably of a sheet of metal bent into tubular or substantially tubular form, with one edge extended beyond the other to constitute a lip or backing 5 for the wiper 1 to rest against and for the further purpose of holding the wiper in place with the opposite edge of the holder firmly seated in the groove 3. The holder thus constituted is so formed that while the two edges 4 and 5 are more or less flexible and movable with relation to each other, they, nevertheless, while in their initial or unrestrained condition stand a slight distance apart so as to allow the wiper 1 to be readily inserted between them and easily slipped along into place with its extremities substantially co-terminous with the extremities of the holder. This is important and material in the construction of the device because otherwise the friction of the flange 4 in the groove of the wiper would be so great as to not only damage the wiper in inserting it but would make it difficult to insert the wiper and unless the inner edge of the holder were smoothly formed might render this method of inserting the wiper impracticable. The groove 3, therefore, should be definitely formed and properly proportioned with respect to the thickness of the flange 4 and the distance between the edge of the flange 4 and the inner face of the lip 5 should be such that the strip 1 may be inserted freely but will be gripped with sufficient force to prevent it from accidentally slipping out of place.

The socket which carries the holder and receives the handle 6 comprises a hollow body portion 7 and two branches or arms 8, 9, having jaws 10 which embrace, or partially embrace, the holder. This socket is made from sheet metal which is first given the form of the blank shown in Fig. 3, the upper or wider portion 7$^a$ of the blank being rolled so that the edges of the metal will abut to form the hollow or tubular portion for receiving the handle, while the bifurcations 8$^a$, 9$^a$ form respectively the branches 8 and 9, these bifurcations being pressed into semi-circular forms in cross section and at the same time bent outwardly to carry the jaw pieces 10 the proper distance apart for embracing the holder. The jaw pieces are formed by the blank portions 10$^a$ and are simply bent into semi-circular form with their axis at substantially right angles to the axis of the hollow body 7. This being done, the semi-circular portion of the holder, which is of substantially the same diameter from end to end, is inserted endwise through the two jaws 10, these, as shown in Fig. 2, being more than a semi-circle in extent so as to prevent the holder from slipping out transversely. When the holder is thus inserted into the jaws, its rotary movement therein is limited in one direction by the flat lip 5 coming against the extremity of each jaw on one side, and by the wiper 1, backed up by the lip 5, coming against the extremity of each jaw on the other side, the friction between the contacting surfaces of the holder and the jaws, induced by the spreading tendency of the holder, being ample to hold the holder against longitudinal movement without soldering or other form of attachment, thus making a device which is composed of a minimum number of simple parts, easily made and easily assembled and consequently inexpensive to manufacture as a whole. Furthermore when the holder is inserted into the jaws it will serve to hold the edges of the metal from separation, thereby preserving the contour of the handle socket by preventing its spreading when a handle is forced therein.

Having thus described my invention, what I claim as new and desire to secure by Letters Patent is—

1. In a device for the purpose described, the combination of a tubular-like holder having a flange and a lip, the said flange extending lengthwise of the lip, opposed to the inner face thereof normally at a distance therefrom so as to leave a space between the face of the lip and the flange and projecting beyond the face of the flange, and a wiper of substantially uniform thickness throughout its body portion and having a groove of definite form corresponding to and receiving said flange, the said wiper being situated between the flange and the lip whereby the lip will have an extended flat bearing against the wiper beyond the flange, the thickness of the wiper at the bottom of the groove thereof being substantially equal to the space between the face of the lip and the edge of the flange whereby the wiper may be inserted endwise between the lip and the flange and readily removed for renewal, the said flange being of a thickness to substantially fill the groove.

2. In a device for the purpose described, the combination of a rubber-holder of tubular formation having a lip extending longitudinally thereof along one edge and transversely across the other edge, and a handle-socket formed of sheet metal bent into shape and provided with jaws partially embracing said holder, said holder being transversely compressible whereby the elasticity thereof will permit it to be inserted longitudinally through the jaw and will be held in the jaw against accidental longitudinal displacement by the friction of the jaw thereagainst, said holder also serving to hold the edges of the socket against separation.

3. In a device for the purpose described, the combination of a wiper-holder and a handle-socket, said handle-socket comprising a sheet of metal having one end rolled until its edges meet to form a tubular body for receiving the handle, the other end of said sheet of metal being bifurcated and the branches of said bifurcation being diverged and rolled transversely in a direction complementary to the curvature of said body portion, the extremities of said branches being rolled on alined axes at right angles to the axis of said tubular portion and in a direction complementary to the curvature of the balance of said branches, to form jaws with curved interiors in extent greater than a semi-circle, the said holder being inserted longitudinally through the semi-circular jaws thus formed and serving to hold the edges of the handle socket against separation.

4. In a device for the purpose described, the combination of a wiper-holder composed of a sheet of metal rolled into tubular form with one edge flat and the other edge turned inwardly opposite the inner face of the flat edge, the flat edge extending outwardly from the other edge to form a lip, a grooved rubber inserted between the face of the flat edge and the other edge with the latter said edge engaging in and substantially filling the groove of the wiper, and a handle-socket constructed of a single piece of metal bent so that the edges of the metal abut and having circular jaws embracing said tubular holder whereby the said holder will secure the edges of the metal against separation, the extremity of each of said jaws on one side being adapted to be engaged by the flat edge of the holder and on the other side by the rubber for limiting the rotary movement of the holder in the jaws.

In testimony whereof I have signed my name to this specification, in the presence of two subscribing witnesses, on this 28th day of September A. D. 1907.

HERBERT L. BAILEY.

Witnesses:
W. L. HAMMOND,
AMES R. LANE.